United States Patent Office 3,732,144
Patented May 8, 1973

3,732,144
PROCESS FOR PRODUCING L-THREONINE
AND L-LYSINE
Kiyoshi Nakayama, Sagamihara, and Hiroshi Kase, Tokyo, Japan, assignors to Kyowa Hakko Kogyo Co., Ltd., Tokyo, Japan
No Drawing. Filed Jan. 18, 1971, Ser. No. 107,554
Claims priority, application Japan, Jan. 22, 1970, 45/5,390
Int. Cl. C12d 13/06
U.S. Cl. 195—29                              9 Claims

ABSTRACT OF THE DISCLOSURE

A process for producing L-threonine and L-lysine simultaneously by fermentation which comprises culturing an L-threonine plus L-lysine-producing certain type mutant strains of coryneform glutamic acid-producing bacteria represented by Corynebacterium glutamicum under aerobic conditions in an aqueous nutrient medium.

This invention relates to a process for producing the amino acids L-threonine and L-lysine. More particularly, it relates to a process for the production of L-threonine and L-lysine by fermentation. Even more particularly, the invention relates to a process for producing L-threonine and L-lysine by fermentation with certain type mutant strains of coryneform glutamic acid-producing bacteria represented by *Corynebacterium glutamicum*. Investigators may classify such glutamic acid-producing bacteria as either Micrococcus, Corynebacterium, Brevibacterium, Arthrobacter or Microbacterium. Coryneform glutamic acid-producing bacteria form a taxonomically closely related group of bacteria as described by Abe et al. in J. General and Applied Microbiology, vol. 13, 279–301 (1967).

It is well known in the art that L-lysine and L-threonine are the amino acids which are deficient in cereal proteins and that the protein efficiency of these proteins is considerably increased by an enrichment with these two amino acids. It is also well known that L-lysine and L-threonine are very important as a nourishment-enriching agent for food, as an additive for animal feeds, etc.

One of the present inventors developed a process for producing L-lysine by fermentation (Japanese Pat. No. 284,339, corresponding to U.S. Pat. 2,979,439) and thereby made it possible, for the first time, to supply L-lysine in an industrially feasible manner. However, in this process, L-threonine is not formed because a microorganism having a defect in the synthesis of threonine is employed. Furthermore, there is no prior art relating to the production of L-lysine and L-threonine simultaneously in high yields. There are known several processes for producing L-threonine by fermentation. However, in some of these processes, a microorganism having a defect in the biosynthesis of L-lysine is used and, therefore, L-lysine is not produced. In addition, even the yield of L-threonine in the culture liquor is very low (note, for example, U.S. Pat. 2,937,121 and U.S. Pat. 2,937,122). In another process of the prior art, L-homoserine, an expensive raw material, is used as the starting substance and, hence, this process is not satisfactory from an industrial point of view for producing threonine; moreover, the formation of L-lysine in the culture liquor has not been observed therewith [U.S. Pat. 3,099,604; Japanese patent publication No. 2,896/61; and Sugawara, Nozaki and Nishimura; Amino Acid and Nucleic Acid, 10, 68 (1964)]. Even in the process for producing L-threonine using hydrocarbons [Takayama, Abe and Kinoshita: Amino Acid and Nucleic Acid, 19, 121 (1969)] and also in the process using a microorganism strain having a resistance to $\alpha$-amino-$\beta$-hydroxyvaleric acid [Agricultural and Biological Chemistry, 33, 1152 (1969)], no formation of L-lysine was recognized.

Accordingly, one of the objects of the present invention is to provide a process for the simultaneous production of the two amino acids, L-threonine and L-lysine, by fermentation which overcomes the disadvantages and deficiencies of the prior art methods.

Another object of the present invention is to provide a process for producing L-threonine and L-lysine simultaneously by fermentation which may be carried out in an efficacious and relatively simple manner.

A further object of the invention is to provide a process for producing L-threonine and L-lysine by fermentation which may be carried out advantageously on an industrial scale at low cost to give a high yield of product.

A still further object of the invention is to provide L-threonine and L-lysine.

These and other objects and advantages of the present invention will become apparent to those skilled in the art from a consideration of the following specification and claims.

Taking notice of the advantage of producing L-lysine and L-threonine simultaneously by fermentation, the present inventors have conducted much research toward the objective of producing both of these amino acids simultaneously during the same course of culturing and, in accordance with the present invention, have found that excellent strains meeting this objective can be found among certain type mutant strains of coryneform glutamic acid-producing bacteria represented by *Corynebacterium glutamicum*. The objective strains are formed among the mutants having such properties, alone or in combination, as a resistance to threonine or threonine analogs (such as $\alpha$-amino-$\beta$-hydroxyvaleric acid, $\beta$-hydroxyleucine, norleucine, etc.) and a resistance to lysine or lysine analogs [such as S-($\beta$-aminoethyl)-cystein, 5-hydroxylysine, 2,6-diaminoheptanoic acid, N-$\epsilon$-formyllysine, trans-2,6-diamino-4-hexenoic acid, 2,6-diaminohexenoic acid, 2-amino($\beta$-aminoethoxy)-propionic acid, 3-aminocyclohexanealanine, 4-azalysine, 3-aminomethylcyclohexaneglycine, etc.]. The possession of the above-mentioned two properties in combination is essential for the simultaneous production of L-lysine and L-threonine by single culturing. In addition to these properties, a methionine-requirement and a resistance to methionine or methionine analogs [such as ethionine, $\alpha$-methylmethionine, norleucine, N-acetyl-1-norleucine, S-trifluoromethylhomocysteine, 2-amino-5-heptenoic acid, 2-amino-4-hexenoic acid, methoxinine, methionine sulfoximine, selenomethionine, etc.] are preferable properties.

The microorganisms used in the present invention are certain type mutant strains of coryneform glutamic acid-producing bacteria represented by *Corynebacterium glutamicum*. Preferred species thereof are shown in the working examples hereinbelow, but it can be generally stated that the following L-glutamic acid-producing microorganisms are preferred in connection with the process of the present invention: *Brevibacterium flavum, Brevibacterium glutamigenum, Brevibacterium divaricatum, Brevibacterium lactofermentum, Brevibacterium thiogenitalis, Brevibacterium saccharolyticum, Brevibacterium ammoniagenes, Brevibacterium sp., Corynebacterium callunae, Corynebacterium acetoacidophilum, Corynebacterium melassecola, Corynebacterium herculis, Corynebacterium sp., Micrococcus sp., Microbacterium ammoniaphilum, Microbacterium flavum* var. *glutamicum, Arthrobacter globiformis, Arthrobacter citreous* and *Arthrobacter* sp.

Either a synthetic culture medium or a natural nutrient medium is suitable for the cultivation of the strains employed in the present invention as long as it contains the essential nutrients for the growth of the strain employed. Such nutrients are well known in the art and include substances such as a carbon source, a nitrogen source, inorganic salts, trace amounts of necessary nutrients and the like which are utilized by the microorganism employed in appropriate amounts.

Thus, as a carbon source, there may be mentioned, by way of example, carbohydrates such as glucose, fructose, maltose, sucrose, mannose, starch, starch hydrolysate, molasses, glycerol, etc., or any other suitable carbon source such as organic acids, for example, acetic acid, lactic acid, pyruvic acid, etc. These substances may be used either singly or in mixtures of two or more. A hydrocarbon or a mixture of hydrocarbons may be employed in the nutrient medium as the main source of carbon in the case of using hydrocarbon-assimilating microorganism strains. Such hydrocarbons include straight and branched-chain paraffins (alkanes), such as n-pentane, n-octane, n-decane, n-dodecane, n-hexadecane, isopentane, isooctane, etc., cycloparaffins, such as cyclohexane and cyclooctane, straight and branched-chain olefins such as pentene-2, hexene-1, octene-1, octene-2, etc., cycloolefins such as cyclohexene, aromatic hydrocarbons such as benzene, o-xylene, p-xylene, etc., and mixtures thereof and mixed hydrocarbons such as kerosene, light oils, heavy oils, paraffin oils, etc., i.e., various petroleum fractions, including petroleum crudes. A carbohydrate or other suitable carbon source may be used in the fermentation medium along with the hydrocarbon, if desired.

As a nitrogen source, various kinds of inorganic or organic salts or compounds, such as urea, ammonia or ammonium salts such as ammonium chloride, ammonium sulfate, ammonium nitrate, ammonium acetate, ammonium phosphate, ammonium carbonate, etc., or natural substances containing nitrogen, such as corn steep liquor, yeast extract, meat extract, peptone, fish meal, bouillon, casein hydrolysates, casamino acid, fish solubles, rice bran extract, NZ-amine (a series of casein hydrolysates), defatted soybean cake, digested products such as digested fish meal or digested defatted soybean cake, chrysalis hydrolysate, etc. may be employed. Again, these substances may be used either singly or in combination of two or more.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate, calcium carbonate, etc.

In the case of strains that require a trace amount of nutrients such as vitamins, amino acids or the like for their growth, these substances are, of course, added to the nutrient medium, unless these nutrients are already contained within the components present in the medium, whereby it is not necessary to specifically add these nutrients to the medium in addition thereto. Such nutrients include, for example, amino acids such as aspartic acid, methionine, etc., and/or vitamins such as biotin, thiamine, cobalamin and the like.

The fermentation or culturing of the microorganisms is conducted under aerobic conditions, such as aerobic shaking of the culture or with stirring and aeration of a submerged culture, at a temperature of, for example, about 20° to 40° C. and at a pH of, for example, about 4 to 9. It is desirable to keep the pH of the medium at around neutral (7.0) during the cultivation in order to obtain a high yield of product, but these particular conditions of temperature and pH are not essential in carrying out the process of the present invention. Considerable amounts of L-lysine and L-threonine are formed simultaneously in the resultant culture liquor usually after a culturing time of from 1 to 5 days.

After the completion of culturing, the two amino acids can be recovered as a feed-enriching agent containing L-lysine and L-threonine by concentrating and drying the culture liquor as is. If desired, these two amino acids can be isolated and recovered separately or together by conventional means, such as ion exchange resin treatment, extraction with solvents, precipitation, adsorption, chromatography or the like.

The following examples are given merely as illustrative of the present invention and are not to be considered as limiting. Unless otherwise noted, the percentages therein and throughout the application are by weight per volume (one liter of water).

EXAMPLE 1

The L-threonine plus L-lysine producing microorganism strain, *Corynebacterium glutamicum* ATCC 21488, obtained from *Corynebacterium glutamicum* ATCC 13032 (which is a synonym of *Micrococcus glutamicus*) by mutation treatment is used as the seed strain. This strain is resistant to both threonine analog ($\alpha$-amino-$\beta$-hydroxyvaleric acid) and lysine analog [S-($\beta$-aminoethyl) cystein] and requires methionine. One ml. of the seed culture obtained by culturing this strain in a seed medium containing 2% glucose, 1% peptone, 1% yeast extract and 0.3% NaCl at 30° C. for 24 hours with aerobic shaking is inoculated into a 250 ml. conical flask containing 10 ml. of a fermentation medium having the following composition:

10% glucose
0.05% $K_2HPO_4$
0.05% $KH_2PO_4$
2% $(NH_4)_2SO_4$
0.025% $MgSO_4 \cdot 7H_2O$
0.001% $FeSO_4 \cdot 7H_2O$
0.001% $MnSO_4 \cdot 4H_2O$
2% $CaCO_3$
400 µg./l. biotin
2 mg./l. thiamine hydrochloride
0.5% NZ-Amine (a series of casein hydrolysates)

The pH of the fermentation medium is 7.2.

Culturing is carried out at 30° C. for 72 hours with aerobic shaking of the culture, whereby L-lysine and L-threonine are formed in the resultant culture liquor in yields of 5.5 mg./ml. and 9.0 mg./ml., respectively. After the removal of the microbial cells and the $CaCO_3$, the L-threonine and L-lysine in the culture liquor are recoverel by an ion exchange resin treatment. The yield of L-lysine and L-threonine from one liter of the culture liquor is 4.4 grams and 6.3 grams, respectively.

EXAMPLE 2

As the seed microorganism, L-lysine plus L-threonine-producing strain *Corynebacterium glutamicum* ATCC 21649 is used. This strain is resistant to both threonine analog ($\alpha$-amino-$\beta$-hydroxyvaleric acid) and lysine analog [S-($\beta$-aminoethyl) cystein]. Culturing is carried out in the same manner and under the same conditions as described in Example 1. The yield of L-lysine and L-threonine is 4.1 mg./ml. and 7.8 mg./ml., respectively.

EXAMPLE 3

As the seed microorganism, L-lysine plus L-threonine-producing strain *Corynebacterium glutamicum* ATCC 21650 is used. This strain is resistant to both threonine analog ($\alpha$-amino-$\beta$-hydroxyvaleric acid) and lysine analog [S-($\beta$-aminoethyl) cystein] and requires methionine. Culturing is carried out in the same manner and under the same conditions as described in Example 1. The yield of L-lysine and L-threonine is 4.6 mg./ml. and 6.9 mg./ml., respectively.

EXAMPLE 4

The L-threonine plus L-lysine-producing strain of *Corynebacterium glutamicum* ATCC 21488 is used as the seed microorganism.

This strain is cultured with aerobic shaking at 30° C. for 24 hours in a seed medium containing 4% glucose, 2% peptone, 0.15% $KH_2PO_4$, 0.05% $K_2HPO_4$, 0.05%

$MgSO_4 \cdot 7H_2O$, 50 μg./l. of biotin and 0.5% yeast extract. One ml. of the thus-obtained seed culture is inoculated into a 250 ml. conical flask containing 10 ml. of a fermentation medium having the following composition:

10% cane blackstrap molasses (in terms of glucose)
2% soybean cake hydrolysate liquor (obtained through decomposition with 6 N $H_2SO_4$ and neutralization by aqueous ammonia; expressed in terms of the weight of soybean cake)
0.3% urea
0.05% $MgSO_4 \cdot 7H_2O$
0.07% $KH_2PO_4$
3% $CaCO_3$ The pH of this medium is 7.2.

Culturing is carried out with aerobic shaking of the culture at 30° C. for 72 hours. The yields of L-lysine and L-threonine formed and accumulated in the resultant culture liquor are 10.3 mg./ml. and 15.2 mg./ml., respectively.

The invention being thus described, it will be obvious that the same may be varied in many ways. Such variation are not to be regarded as a departure from the spirit and scope of the invention, and all such modifications as would be obvious to one skilled in the art are intended to be included herein.

We claim:
1. A process for producing L-threonine and L-lysine simultaneously by fermentation which comprises culturing a mutant strain having the properties of a resistance to threonine or threonine analogs and a resistance to lysine or lysine analogs, said strain belonging to coryneform glutamic acid-producing bacteria represented by *Corynebacterium glutamicum*, under aerobic conditions in an aqueous nutrient medium, accumulating L-threonine and L-lysine in the resultant culture liquor, and recovering the L-threonine and L-lysine therefrom.

2. The process of claim 1, wherein said strain requires methionine for its growth.

3. The process of claim 2, wherein said strain also has a resistance to methionine or to analogs of methionine.

4. The process of claim 1, wherein said strain has a resistance to methionine or to analogs of methionine.

5. The process of claim 1, wherein said strain is *Corynebacterium glutamicum* ATCC 21488.

6. The process of claim 1, wherein said strain is *Corynebacterium glutamicum* ATCC 21649.

7. The process of claim 1, wherein said strain is *Corynebacterium glutamicum* ATCC 21650.

8. The process of claim 1, wherein culturing is carried out at a temperature of about 20° to 40° C. and at a pH of about 4 to 9.

9. The process of claim 8, wherein the pH of the medium is maintained at around 7.0 during the culturing.

References Cited
UNITED STATES PATENTS

| | | | |
|---|---|---|---|
| 3,562,110 | 2/1971 | Dours et al. | 195—28 R |
| 3,582,471 | 6/1971 | Shiio et al. | 195—29 |
| 3,524,797 | 8/1970 | Woodruff et al. | 195—29 |
| 2,979,439 | 4/1961 | Kinoshita et al. | 195—30 |

ALVIN E. TANENHOLTZ, Primary Examiner

U.S. Cl. X.R.
195—47